(12) United States Patent
Farrelly et al.

(10) Patent No.: US 10,520,617 B2
(45) Date of Patent: Dec. 31, 2019

(54) BIODEGRADABLE GROUND CONTACT SLEEVE FOR A SEISMIC DATA ACQUISITION NODE

(71) Applicant: Geophysical Technology, Inc., Bellaire, TX (US)

(72) Inventors: Justin Nicholas Farrelly, Plano, TX (US); Richard A. Degner, Belaire, TX (US)

(73) Assignee: Geophysical Technology, Inc., Bellaire, TX (US)

( * ) Notice: Subject to any disclaimer, the term of this patent is extended or adjusted under 35 U.S.C. 154(b) by 264 days.

(21) Appl. No.: 15/459,195

(22) Filed: Mar. 15, 2017

(65) Prior Publication Data

US 2017/0184743 A1    Jun. 29, 2017

Related U.S. Application Data

(63) Continuation of application No. PCT/US2015/053083, filed on Sep. 30, 2015.

(60) Provisional application No. 62/058,089, filed on Sep. 30, 2014.

(51) Int. Cl.
*G01V 1/16* (2006.01)
(52) U.S. Cl.
CPC ................... *G01V 1/166* (2013.01)
(58) Field of Classification Search
CPC . G01V 1/16; G01V 1/00; G01V 1/168; G01V 1/20; C08L 2201/06; C08L 3/02; B65D 1/0215; B65D 1/023; B65D 23/02; B65D 53/02; B65D 77/06; B65D 83/0055; B65D 83/14; B65D 83/38
See application file for complete search history.

(56) References Cited

U.S. PATENT DOCUMENTS

| | | |
|---|---|---|
| 6,425,442 B1 * | 7/2002 | Latiolais, Jr. ........... E21B 17/14 166/177.4 |
| 6,657,921 B1 | 12/2003 | Ambs |
| 2009/0007673 A1 | 1/2009 | Pichot et al. |
| 2012/0134237 A1 | 5/2012 | Esteban-Campillo et al. |
| 2012/0322908 A1 | 12/2012 | Bastioli |
| 2013/0308426 A1 | 11/2013 | Scarlatti et al. |
| 2014/0202975 A1 | 7/2014 | Tom et al. |

FOREIGN PATENT DOCUMENTS

WO    2007133159 A1    11/2007

OTHER PUBLICATIONS

International Search Report and Written Opinion, International Application No. PCT/US15/53083.

\* cited by examiner

*Primary Examiner* — Yan Lan
(74) *Attorney, Agent, or Firm* — Richard A. Fagin

(57) ABSTRACT

A biodegradable ground contact sleeve for a seismic data acquisition node includes a ground contact sleeve having a substantially tubular shaped body insertable into the surface of the earth and having an internal opening at one longitudinal end for receiving a seismic data acquisition node and making acoustic coupling thereto. The ground contact sleeve is formed of biodegradable material.

9 Claims, 8 Drawing Sheets

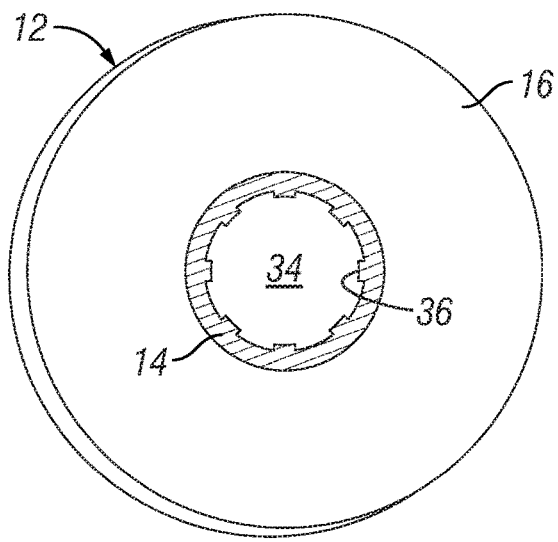
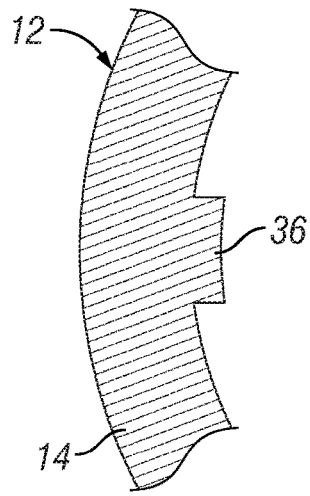
FIG. 7    FIG. 8
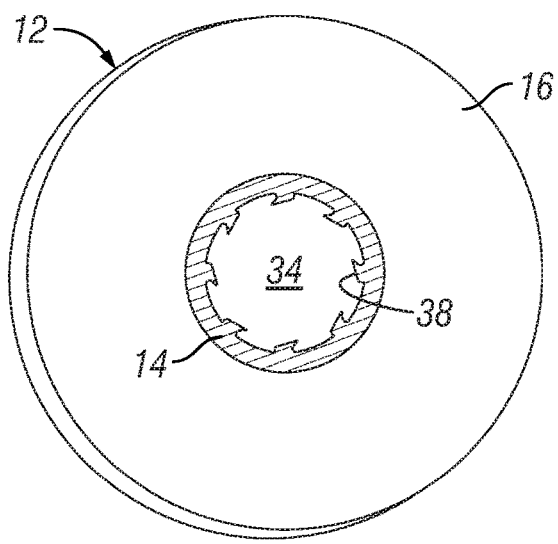
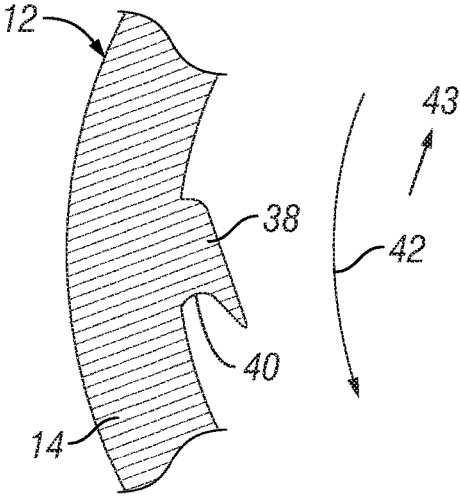
FIG. 9    FIG. 10

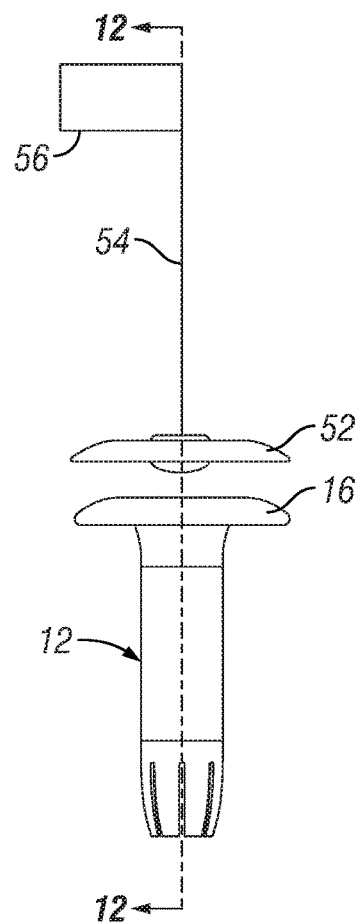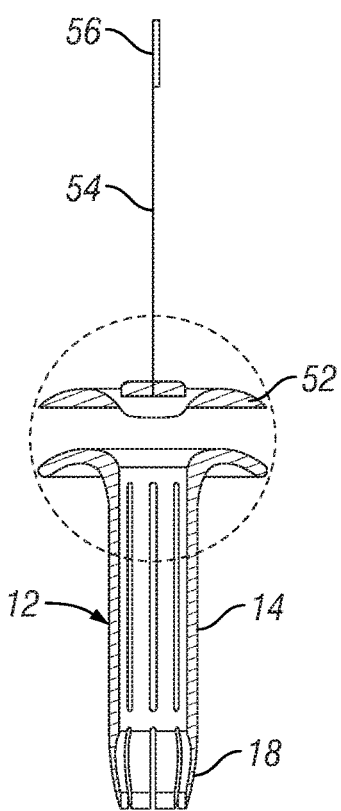
*FIG. 11*  *FIG. 12*
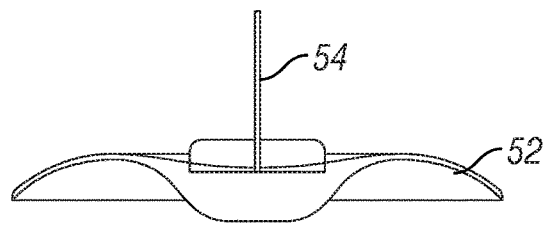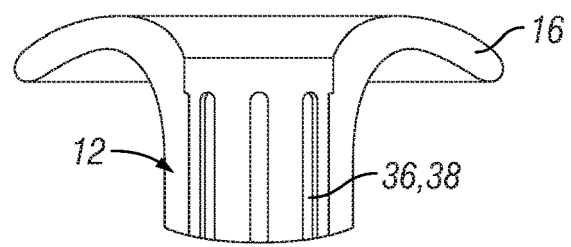
*FIG. 13*

US 10,520,617 B2

BIODEGRADABLE GROUND CONTACT SLEEVE FOR A SEISMIC DATA ACQUISITION NODE

CROSS REFERENCE TO RELATED APPLICATIONS

This is a continuation of International Application No. PCT/US15/53083 filed on Sep. 30, 2015. Priority is claimed from U.S. Provisional Application No. 62/058,089 filed on Sep. 30, 2014.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

The present disclosure relates in general to seismic data acquisition, and in particular to mounting of seismic data acquisition nodes to and into earth surfaces.

Seismic data acquisition nodes have been used for acoustically coupling seismic sensors to earth surfaces, both above the ground and mounted into the ground. A sensor node is a self-contained device that comprises one or more sensors and sensor signal processing and recording devices. The nodes may be deployed individually or arranged in an array and then used for acquiring seismic data resulting from seismic energy imparted into the earth or seismic energy that occurs naturally or from other subsurface phenomena. The acquisition nodes are conventionally mounted in holes formed into the earth, and ground contact sleeve devices formed into the housing of the nodes or affixed to the nodes have been used to acoustically couple the acquisition nodes to the ground. The acquisition nodes and the ground contact sleeve devices are removed from the ground and collected after use. Removing acquisition nodes having ground contact sleeve devices from the ground is time consuming and expensive, especially for those devices which are wedged into the ground.

BRIEF DESCRIPTION OF THE DRAWINGS

FIG. 7 is cross-sectional view of the ground contact sleeve, taken along section line 7-7 of FIG. 6.

FIG. 8 is an enlarged view of a portion of the sectional view of the ground contact sleeve of FIG. 7 showing a squared geometric configuration for the internal ribs of the ground contact sleeve.

FIG. 9 is cross-sectional view of an alternative embodiment of the ground contact sleeve, taken along section line 7-7 of FIG. 6.

FIG. 10 is an enlarged view of a portion of the sectional view of another embodiment of ground contact sleeve of FIG. 9, showing an angular directional gripping configuration for the internal ribs of the ground contact sleeve having a rotational collapsing feature to provide for release of the acquisition node from within the ground contact sleeve with rotation of the node in a first angular direction and to provide for gripping of the acquisition node when the node is rotated in a second angular direction.

FIG. 11 is side elevation, exploded view of the ground contact sleeve with a pin cap and pin flag to assist in a user locating the ground contact sleeve in the field.

FIG. 12 is cross-sectional view of the ground contact sleeve, pin cap and pin flag of FIG. 11, taken along section line 12-12.

FIG. 13 is detail view of an upper portion of the ground contact sleeve and the pin cap of the cross sectional view of FIG. 12.

DETAILED DESCRIPTION

Figure 1:
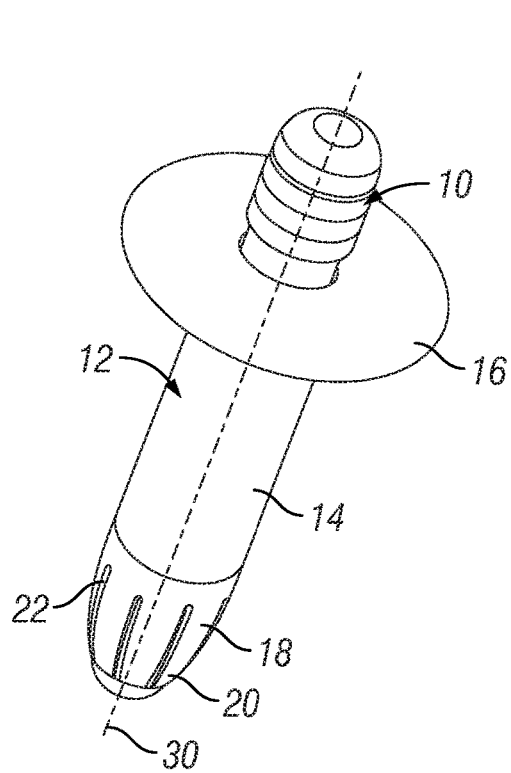
FIG. 1 is perspective view of a biodegradable ground contact sleeve and a seismic data acquisition node, showing the node mounted in the ground contact sleeve.

FIG. 1 is perspective view of a biodegradable ground contact sleeve 12 and a seismic data acquisition node 10, showing the seismic data acquisition node 10 mounted in the ground contact sleeve 12. The ground contact sleeve 12 may have a tubular shaped body 14 and an upper end defining a stop or flange 16. The flange 16 may have an arcuate shaped profile with a concave-shaped lower surface and a convex shaped upper surface. The ground contact sleeve 12 has a lower end 18 wherein longitudinally extending, vertical slots 22 define finger-like tabs 20. The tabs 20 may be angularly spaced apart about a longitudinal axis 30 of the ground contact sleeve 12 and the acquisition node 10.

Figure 2:
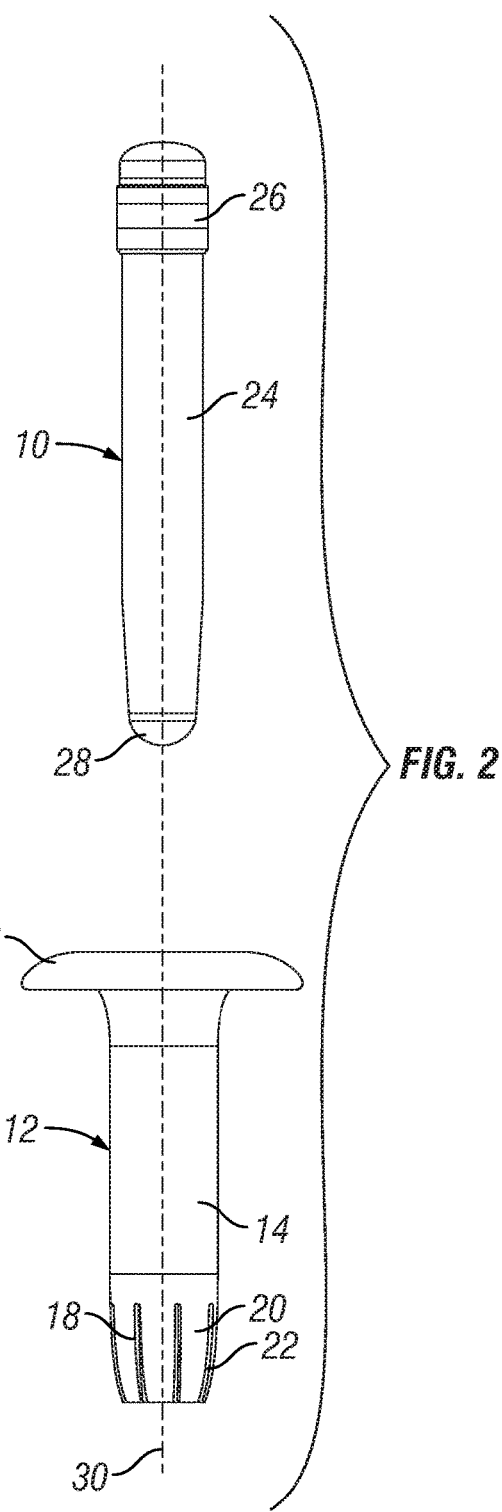
FIG. 2 is an exploded view showing the seismic data acquisition node removed from the ground contact sleeve.

FIG. 2 is an exploded view showing the seismic data acquisition node 10 removed from the ground contact sleeve 12. The seismic data acquisition node 10 is shown having a housing 24 which may have a cylindrically shaped exterior profile, a head 26 which may house a wireless transceiver (not shown), and a lower end having a nose 28.

Figure 3:
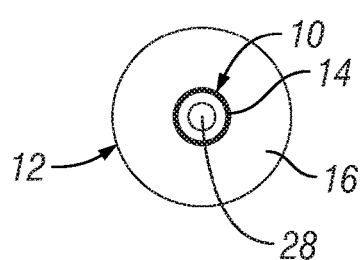
FIG. 3 is bottom view of the ground contact sleeve and acquisition node of FIGS. 1 and 4.
Figure 4:
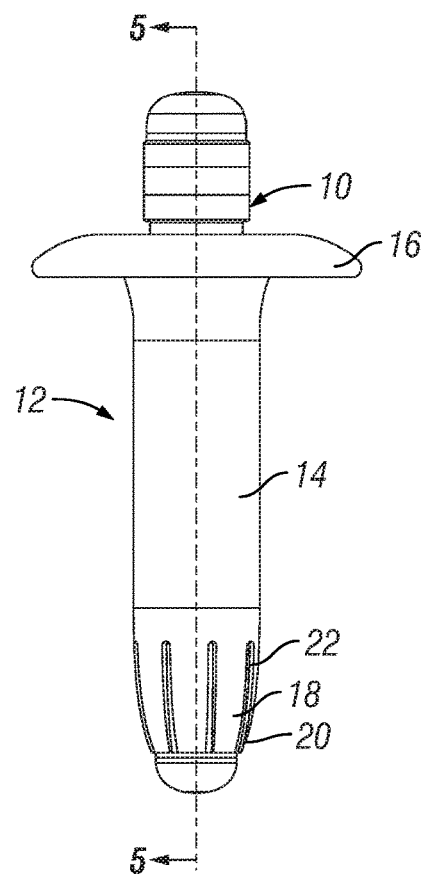
FIG. 4 is side elevation view of the ground contact sleeve with the acquisition node mounted within the ground contact sleeve.

FIG. 3 is bottom view of the ground contact sleeve 12 and seismic data acquisition node 10 of FIGS. 1 and 4.

FIG. 4 is a side elevation view of the ground contact sleeve 12 with the acquisition node 10 mounted within the ground contact sleeve 12.

Figure 5:
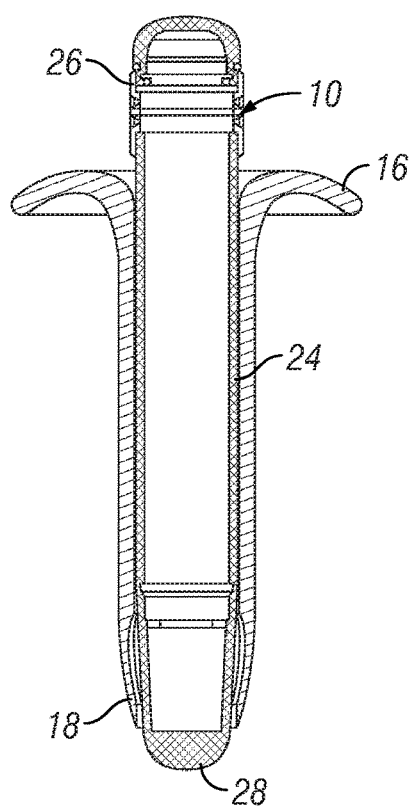
FIG. 5 is longitudinal section view of the ground contact sleeve and acquisition node, taken along section line 5-5 of FIG. 4.
Figure 6:
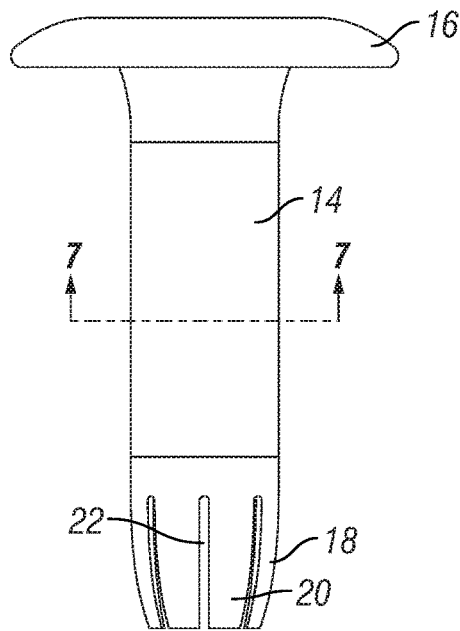
FIG. 6 is side elevation view of the ground contact sleeve after removal of the acquisition node.

FIG. 5 is longitudinal section view of the ground contact sleeve 12 and acquisition node 10, taken along section line 5-5 in FIG. 4. FIG. 6 is a side elevation view of the ground contact sleeve 12 after removal of the seismic data acquisition node 10.

FIG. 7 is a cross-sectional view of the ground contact sleeve 12, taken along section line 7-7 in FIG. 6. The ground contact sleeve 12 may have an interior passage 34 with ribs 36 protruding inwardly from the inner wall of the tubular body 14 to provide spacers and grip protrusions for securing and acoustically coupling the seismic data acquisition node 10 within the ground contact sleeve 12.

FIG. 8 is an enlarged view of a portion of the sectional view of the ground contact sleeve 12 of FIG. 7, showing a squared geometric configuration for the internal ribs 36 of the ground contact sleeve 12.

FIG. 9 is cross-sectional view of another embodiment of the ground contact sleeve 12, taken along section line 7-7 of FIG. 6, showing another configuration of ribs 38 for acoustically coupling the seismic data acquisition node 10 within the ground contact sleeve 12.

FIG. 10 is an enlarged view of a portion of the sectional view of the embodiment of the ground contact sleeve 12 of FIG. 9, showing an angular directional gripping configuration for the internal ribs 38 of the ground contact sleeve 12 having a rotational collapsing feature to provide for release of the acquisition node 10 from within the ground contact sleeve 12 with rotation of the seismic data acquisition node 10 in a first direction 42 and to provide for gripping of the acquisition node 10 when the node 10 is rotated in a second direction 43 opposite to the first direction 42. To provide such directional features on the ribs 38, a longitudinally extending recess 40 may be provided by a slot or a channel which extends the full longitudinal length of respective ones of the ribs 38, parallel to the longitudinal axis 30 (shown in FIGS. 1 and 2). The ground contact sleeve 12 may mounted in the ground such that the ribs 38 and the respective recesses 40 extend substantially vertically. The inward edge of the recess 40 may have an arcuate shape.

FIG. 11 is side elevation, exploded view of the ground contact sleeve 12 with a pin cap 52, a pin 54, and pin flag 56 to assist in a user locating the ground contact sleeve 12 when it is deployed in the ground.

FIG. 12 is cross-sectional view of the ground contact sleeve 12, pin cap 52, the pin 54, and the pin flag 56 of FIG. 11, taken along section line 12-12 in FIG. 11.

FIG. 13 is detail view of an upper portion of the ground contact sleeve 12 and the pin cap 52 of the cross-sectional view of FIG. 12.

Figure 14:
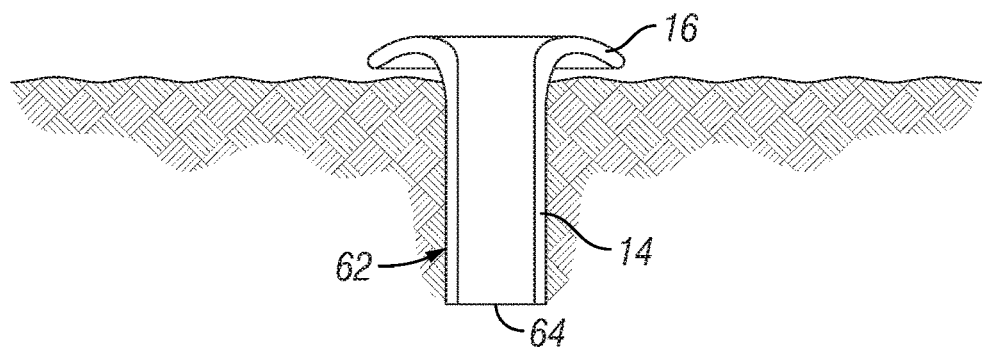
FIG. 14 is a schematic view of an open-ended ground contact sleeve mounted in the earth, with the ground contact sleeve shown in a longitudinal cross-section.

FIG. 14 is a schematic view of an open-ended ground contact sleeve 62 mounted in the earth, with the ground contact sleeve 62 shown in a longitudinal cross-section. The ground contact sleeve 62 may have a fully open lower end 64.

Figure 15:
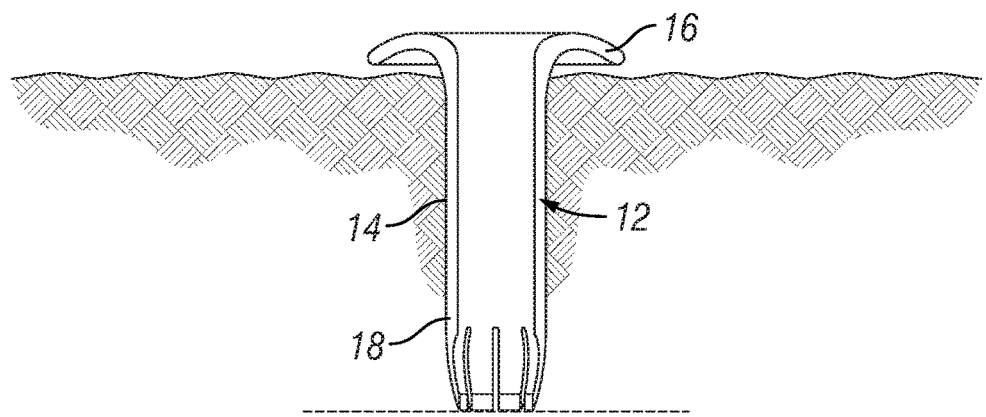
FIG. 15 is a schematic view of a flute-ended ground contact sleeve mounted in the earth, with the fluted ended ground contact sleeve shown in a longitudinal cross-section.

FIG. 15 is a schematic view of a flute-ended ground contact sleeve 12 mounted in the ground, with the fluted-ended ground contact sleeve 12 shown in longitudinal cross-section. The ground contact sleeve 12 has a fluted lower end 18 as described above.

Figure 16:
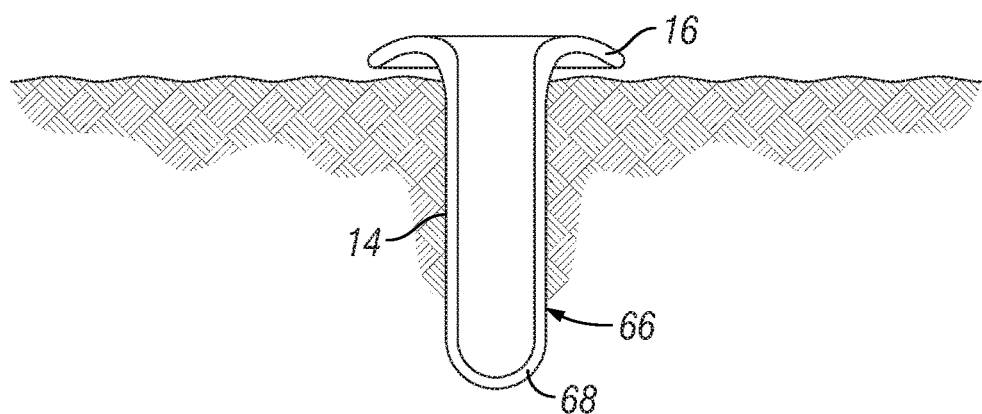
FIG. 16 is a schematic view of a closed-ended ground contact sleeve mounted in the earth, with the closed ended ground contact sleeve shown in a longitudinal cross-section.

FIG. 16 is a schematic view of a closed-ended ground contact sleeve 66 mounted in the earth, with the closed-ended ground contact sleeve 66 shown in longitudinal cross-section. The ground contact sleeve 66 may have an enclosed lower end 68.

Figure 17:
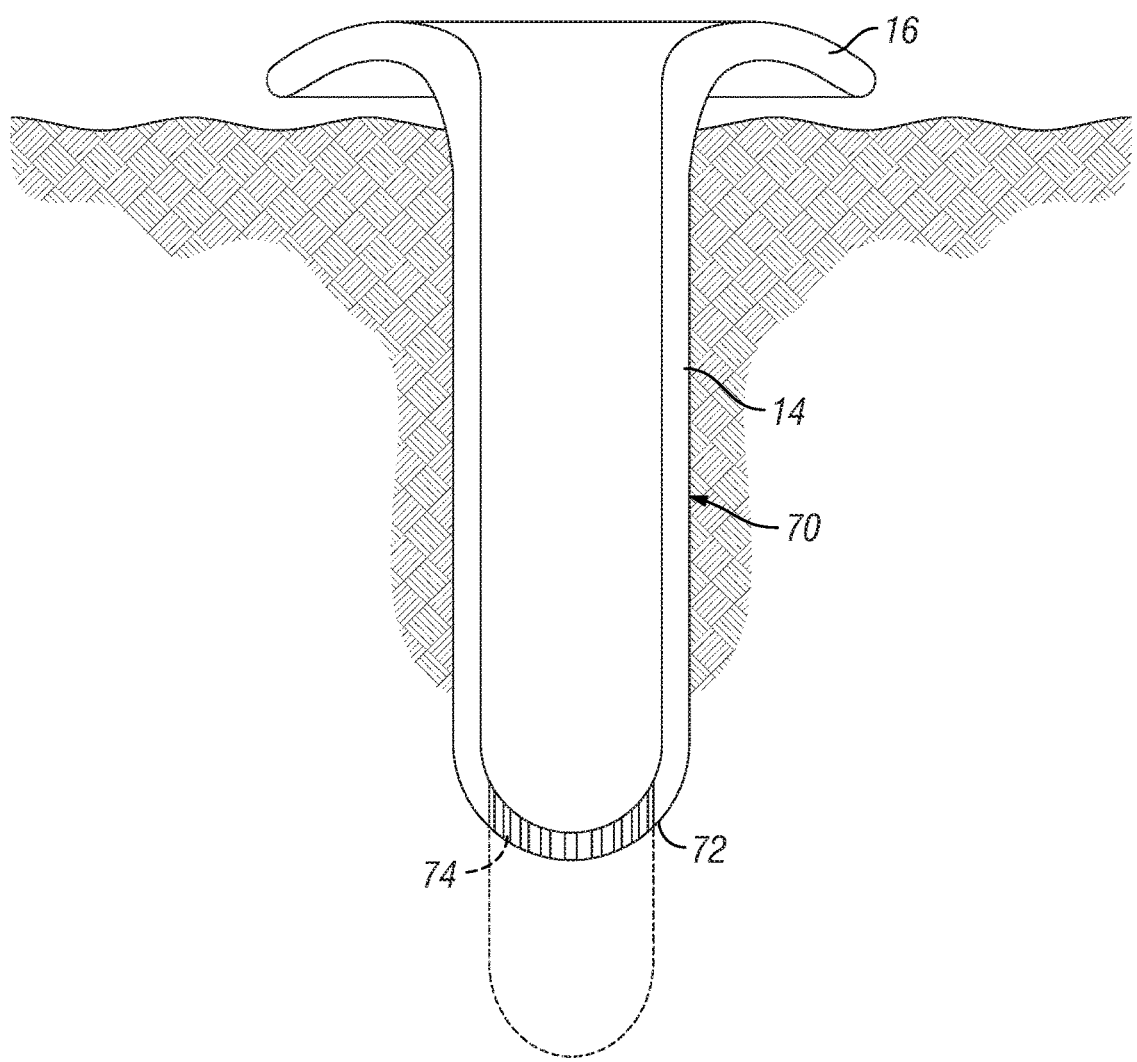
FIG. 17 is a schematic view of a second closed-ended ground contact sleeve mounted in the earth, with the second closed-ended ground contact sleeve shown in a longitudinal cross-section and with the closed end being ribbed, or having a grooved lower surface to allow penetration of the acquisition node through the closed end and into soil/earth after installation of the ground contact sleeve into the ground.

FIG. 17 is a schematic view of a second closed-ended ground contact sleeve 70 mounted in the ground with a second closed-ended ground contact sleeve 70 shown in a longitudinal cross-section and with the closed end 72 being ribbed, or having recesses 74, grooves, or an otherwise thinned lower end 72 to allow penetration of the seismic data acquisition node 10 through the closed end and into the ground after installation of the ground contact sleeve 70 into the ground.

Figure 18:
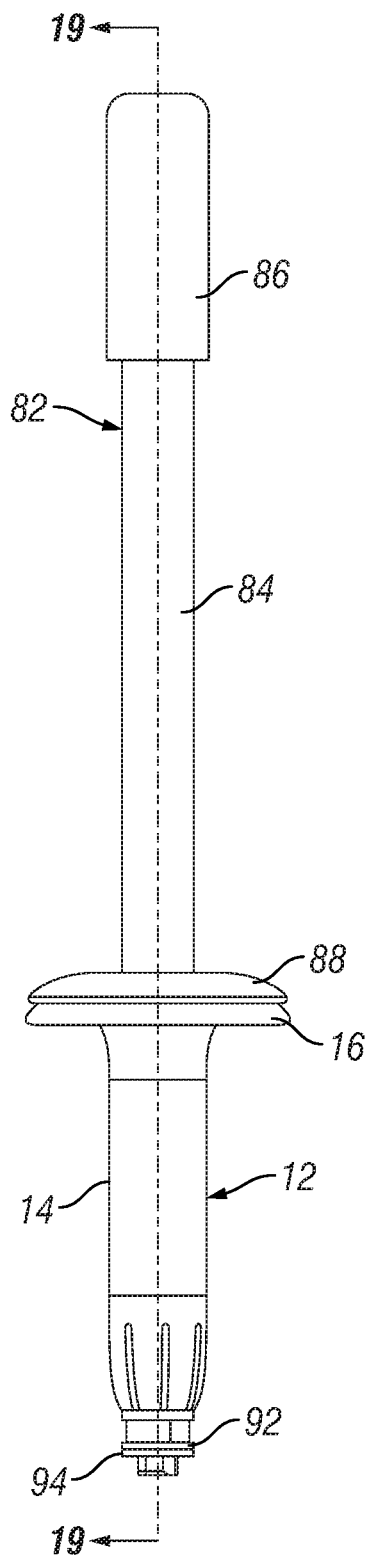
FIG. 18 is side elevation view of an insertion tool with the ground contact sleeve mounted thereto for insertion into the terrain.
Figure 19:
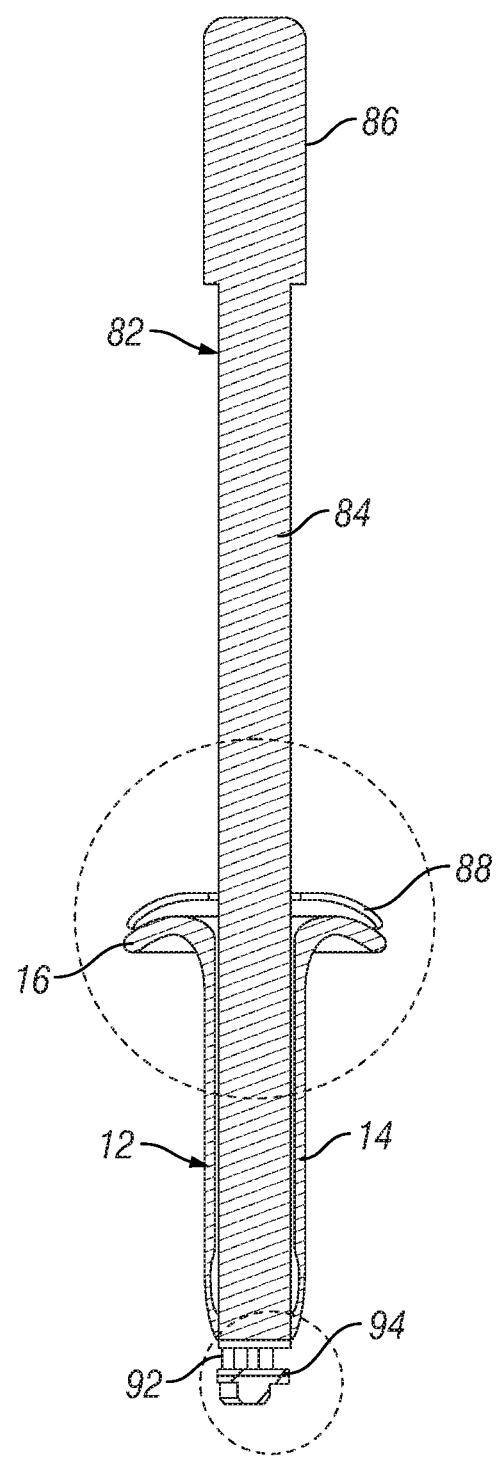
FIG. 19 is longitudinal section view of the insertion tool and the ground contact sleeve, taken along section line 19-19 of FIG. 18.

FIG. 18 is side elevation view of a insertion tool 82 with the ground contact sleeve 12 mounted thereto for insertion into the ground, and FIG. 19 is longitudinal section view of the insertion tool 82 and the ground contact sleeve 12, taken along section line 19-19 of FIG. 18.

Figure 20:
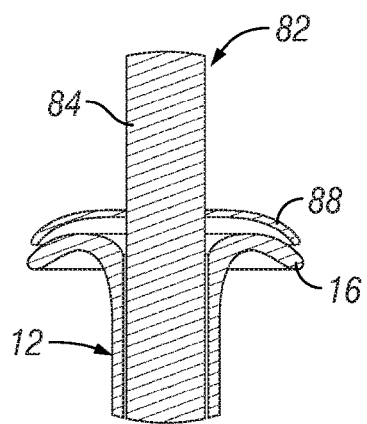
FIG. 20 is a detail view of an intermediate portion of the insertion tool and the ground contact sleeve

FIG. 20 is a detail view of an intermediate portion of the insertion tool 82 and the ground contact sleeve 12. The insertion tool 82 has a centrally disposed insertion pole 84, a grip handle 86 and a stop 88 which preferably fits flush against the upper end of the flange 16 of the ground contact sleeve 12. When the insertion tool 82 is used manually by a person, the person may place his foot on the stop flange 88 to use his weight to push the panting tool and the ground contact sleeve into the ground. The insertion tool 82 may also be mechanized for automatic use as part of a mobile insertion unit. The lower end 92 of the insertion tool 82 has a retractable cutter 94.

Figure 21:
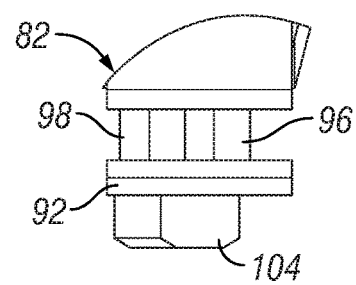
FIG. 21 is an enlarged view of a portion of FIG. 18, showing the two rotary extending cutting cam pawls at the lowermost end of the insertion tool.
Figure 22:
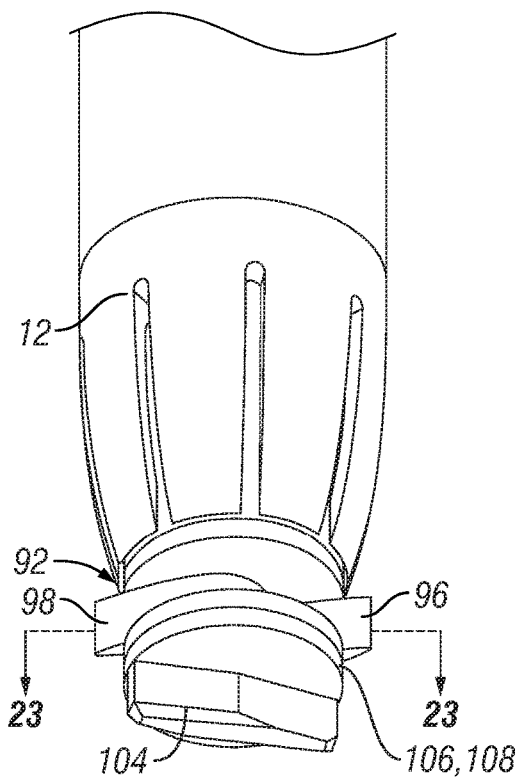
FIG. 22 is a perspective view of the lower end of the insertion tool, showing the two rotary extending cutting cam pawls.

FIG. 21 is an enlarged view of a portion of FIG. 18, showing two rotary extending cutting cam pawls 96, 98 at the lowermost end 92 of the insertion tool 82. FIG. 22 is a perspective view of the lower end 92 of the insertion tool 82, showing the two rotary extending cutting cam pawls 96, 98.

Figure 23:
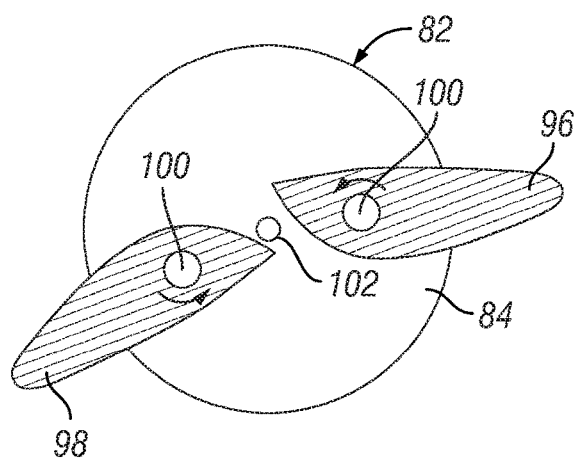
FIG. 23 is a cross-sectional view taken along section line 23-23 of FIG. 22, and shows the retractable cutter located in the lower end of the insertion tool.

FIG. 23 is a cross-sectional view taken along section line 23-23 of FIG. 22, and shows the cutting tool retractable cutter 94 located in the lower end 92 of the insertion tool 82. Friction of the lower end 92 of the insertion tool 82 rotating in the ground will cause the cam pawls to extend and retract, depending upon the direction of rotation of the insertion tool 82 in the ground. The lowermost end of the insertion tool 82 may have a cutting tool 104 which preferably has sharpened edges for cutting into the ground surface. The rotary cutting pawls 96 and 98 are each pivotally mounted to one of two respective pins 100, and a stop pin 102 is provided proximately between the two pins 100 to provide a stop for the cutting pawls 96 and 98 when in the fully extended position.

In one example embodiment, a geometric pattern of ridges on an exterior surface of the ground contact sleeve 12 may include such features as diamonds, ovals, squares and/or other geometric shapes that increase the surface area of contact between the ground contact sleeve and the surface soil from 100 mm$^2$ to 1000 mm$^2$, with a preferred range of 500 to 750 mm$^2$. The configuration of external features and ground contact surface area for any example ground contact sleeve may be optimized for a particular soil type. For example for sandy soil, squares that increase the surface area by 750 mm$^2$ may provide optimal contact between the ground contact sleeve and the surface soil.

In another example embodiment, the exterior of the ground contact sleeve may comprise a feature on an upper end thereof capable of affixing a cap to deter contamination of the interior of the ground contact sleeve with sediment and debris.

In another example embodiment, the interior surface of the ground contact sleeve may include inward protrusions of various configurations explained further below that provide increased contact surface area with the seismic data acquisition node (10 in FIG. 1), while providing space for the ejection of debris upon insertion of a node (10 in FIG. 1) into the ground contact sleeve (12 in FIG. 1).

A ground contact sleeve left in place in the ground to provide an identical sensor position for 4D seismic imaging may accumulate sediment or debris in the interior over time, even when a using a cap. By using inward protrusions, such embodiments may enable a sensor to be inserted into the ground contact sleeve even when the interior of the ground contact sleeve is partially or completely filled with liquid and debris.

In another embodiment, features such as splines on an interior wall or the top surface of the ground contact sleeve 100 may be in the form of longitudinal lines separated by at least 2 mm and up to 10 mm. The longitudinal lines should provide acoustic coupling to the sensor and allow for ejection of debris or sediment when the sensor is inserted into the ground contact sleeve. The height of the splines may be selected to provide an interference fit between the splines and the sensor housing (105 in FIG. 4) for good acoustic coupling.

To achieve the optimum coupling of a seismic wave sensor to composite-material, biodegradable device, feature components must simultaneously aid the transmission of seismic waves, while also comprising chemically labile groups. [Labile is generally defined as chemical groups that react with common environmental compounds such as water and oxygen in the presence of sunlight to bring about the scission or oxidation of groups that lead to decomposition of chemical species]. Those skilled in the art would recognize that in a generic sense, the quality of recorded data, is directly related to the contact of the sensor, sleeve for sensor insertion into the earth, and the soil surrounding the device. It is generally accepted that rigid materials achieve that principle, while elastomeric materials would absorb some of this energy. Further, since seismic transmission largely derives from the particle displacement, materials capable of absorbing such energy tend to polymers with long chains, well aligned chains or elastomers that distribute the energy by molecular vibrations of the chain. By contrast, polymers with rigid structures whose internal degrees of freedom is restricted, would general be better at transmitting such seismic energy.

Selection of a material that is biodegradable may take account of a number of different physical requirements for the ground contact sleeve. Physically, rigid, full surface area contact between the ground contact sleeve with any form of acoustic sensor would provide better acoustic coupling between the ground and the sensor than a contact arrangement comprising large air gaps. A multitude of raised ridges as in various embodiments described above in principle would have greater surface area than a smooth surface and such ridges would have greater contact, and therefore, greater data fidelity due to the increased number of rigid contacts, as described above.

Generally, materials that are more favorable for environmental degradation, i.e., biodegradability, often have mechanical properties that tend to attenuate acoustic energy, thus reducing the effectiveness of the ground contact sleeve.

In some embodiments of a ground contact sleeve according to the present disclosure, composite materials comprising biodegradable components such as cellulose, while also comprising biodegradable thermoplastics may provide both good acoustic coupling between the ground contact sleeve and the sensor node while having the desired biodegradability.

One type of plastic that may be used in some embodiments is polylactic acid (PLA). PLA decomposes in the presence of water and oxygen into carbon dioxide and water. Such decomposition processes, encompassed by the term "hydrolysis", occur at rates that are related to temperature, time, water, and soil composition. Physical impregnation of cotton fiber (cellulosic polymers) by a water labile thermoplastic such as PLA may affect the stability of a composite material depending on the thickness of and the numbers of and layers of thermoplastic accessible to water. In one embodiment, the PLA is prepared with long carbon fiber to improve acoustic performance.

In some embodiments the material for the ground contact sleeve may be made in layers by rastering molten plastic (e.g., PLA) over a sheet of canvas (e.g., made from cotton or cellulose). In other embodiments, canvas sheet may be dipped into molten PLA, rolled and dried around a mold to achieve the desired shape.

In other embodiments, PLA thermoplastic may be stabilized by additives that microscopically reverse the first steps of hydrolysis by catalytic protection. Such additives can be added during the original synthesis of the polymer, or added during the thermal processing into the canvas. Examples of such additives may include inorganic salts such as silicates, or aluminates. Solid polysaccharide polymers such as cellulosics and galactomannans are known to absorb water, so as to protect the polylactic acid from hydrolysis, thus increasing the useful lifetime of the ground contact sleeve.

The mechanical properties of the PLA may be adjusted by the addition of rigid comonomers. Such comonomers may also affect the hydrolysis rate. Examples of comonomers may include phenyl subunits, such as benzene dicarboxylic acids, [terephthalic acid, CAS 100-21-0, isophthalic acid, CAS 121-91-5, and phthalic acid, CAS 88-99-3] or naphthalene dicarboxylic acids, such as 2,3-naphthalenedicarboxylic acid CAS 2169-87-1 or 1,4-naphthalenedicarboxylic acid, CAS 605-70-9. One skilled in the art will recognize that carboxylic acid derivatives of the foregoing compounds may also be used. The foregoing examples are therefore illustrative and not limiting as to the scope of the present disclosure. Such derivatives may include aldehydes, ester, anhydride and/or acid chlorides. In other embodiments, intramolecular ester hydrolysis of rings or macrocylic rings may be used. The common element of these derivatives would follow the synthetic route of condensation polymerization and copolymerization. The particular rigid comonomers used may be selected to cause the ground contact sleeve to have acoustic impedance selected to match local soil conditions and to provide a desired time through which the ground contact sleeve would maintain stability before biodegradation. For example, soil pH will vary depending on the minerals present in the soil. The soil pH will buffer or accelerate the hydrolysis.

Composite materials comprising canvas/PLA can also be thermally molded with a hot iron that uses the thermoplastic properties mold the composite to possess raised indentations on the interior surface to increase the rigid coupling surface area.

For time-lapse seismic surveying, the duration of the interval between seismic surveys will determine the length of time the biodegradable ground contact sleeve should maintain its mechanical integrity. To that end, the choice of additives to the PLA would be chosen to meet the interval described.

A ground contact sleeve for a seismic data acquisition node according to the present disclosure may provide a ground contact sleeve for coupling a seismic data acoustic node to the ground, wherein the ground contact sleeve is biodegradable and may be left in the ground indefinitely when the seismic data acquisition node is removed after use. In some embodiments, the biodegradable material may comprise seeding material to provide plant growth after use and abandoning of the ground contact sleeve.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A biodegradable ground contact sleeve for a seismic data acquisition node, comprising:
    a ground contact sleeve having a substantially tubular shaped body insertable into the surface of the earth and having an internal opening at one longitudinal end for receiving a seismic data acquisition node and making acoustic coupling thereto;
    wherein the ground contact sleeve is formed of biodegradable material;
    wherein said tubular body has an open lower longitudinal end opposite the one longitudinal end; the open longitudinal end of the tubular body comprising slots to provide longitudinally extending fingers angularly spaced about the lowermost end of the tubular body; and
    an insertion tool comprising an insertion pole arranged to pass through the open longitudinal end, a grip handle and a stop flange arranged to fit flush against a flange on the one longitudinal end of the ground contact sleeve, the insertion tool further comprising a plurality of rotary extending cutting cam pawls disposed on a lowermost end of the insertion pole.

2. The biodegradable ground contact sleeve according to claim 1, wherein the tubular shaped body has a plurality of inwardly protruding ribs on an interior surface of the internal opening, the ribs extending in a substantially longitudinal direction, the ribs angularly spaced apart about the interior surface.

3. The biodegradable ground contact sleeve according to claim 2, wherein the ribs are formed with a longitudinally extending recess on one side thereof such that the ribs collapse radially outwardly to release the acquisition node when the acquisition node is rotated in a first direction, the ribs urged inwardly to grip the acquisition node when the acquisition node is rotated in a second direction opposed to the first direction.

4. The biodegradable ground contact sleeve according to claim 1, further including seeding material to provide plant growth after use and abandoning of the ground contact sleeve.

5. The biodegradable ground contact sleeve according to claim 1 wherein the biodegradable material comprises a polylactic acid and cellulose.

6. The biodegradable ground contact sleeve according to claim 5 further comprising carbon fiber.

7. The biodegradable ground contact sleeve according to claim 5 wherein the cellulose is in the form of a fabric.

8. The biodegradable ground contact sleeve according to claim 5 wherein the biodegradable material further comprises a solid polysaccharide polymer.

9. The biodegradable ground contact sleeve according to claim 8 wherein the biodegradable material further comprises a rigid comonomer, and wherein an amount of the solid polysaccharide polymer and rigid comonomer are selected to provide the ground contact sleeve with selected acoustic properties and selected mechanical stability time before biodegradation.

* * * * *